United States Patent [19]

Matsumoto et al.

[11] Patent Number: 5,670,551
[45] Date of Patent: Sep. 23, 1997

[54] CROSSLINKED FOAMED BODY AND A PROCESS FOR ITS PRODUCTION

[75] Inventors: Muneyuki Matsumoto; Keiji Okada; Yoshihisa Matsuo; Akemi Uchimi, all of Ichihara, Japan

[73] Assignee: Mitsui Petrochemical Industries, Ltd., Tokyo, Japan

[21] Appl. No.: 501,063

[22] PCT Filed: Dec. 12, 1994

[86] PCT No.: PCT/JP94/02081

§ 371 Date: Aug. 11, 1995

§ 102(e) Date: Aug. 11, 1995

[87] PCT Pub. No.: WO95/16732

PCT Pub. Date: Jun. 22, 1995

[30] Foreign Application Priority Data

Dec. 16, 1993 [JP] Japan ..................................... 5-317098

[51] Int. Cl.⁶ ..................................................... C08J 9/10
[52] U.S. Cl. ..................... 521/90; 521/94; 521/142; 521/143; 521/145
[58] Field of Search ..................................... 521/142, 143, 521/145, 90, 94

[56] References Cited

U.S. PATENT DOCUMENTS

| | | | |
|---|---|---|---|
| 5,004,787 | 4/1991 | Tojo et al. | 525/349 |
| 5,310,818 | 5/1994 | Tojo et al. | 525/348 |
| 5,470,919 | 11/1995 | Tojo et al. | 525/348 |

*Primary Examiner*—Morton Foelak
*Attorney, Agent, or Firm*—Sherman and Shalloway

[57] ABSTRACT

A crosslinked foamed body obtained by subjecting a rubber compounded product comprising (A) a chlorinated ethylene/α-olefin copolymer rubber, (B) a triazinethiol as a vulcanization agent, (C) an alkyl ammonium halide as a vulcanization promotor, and (D) a hydrazide-type blowing agent to two step vulcanization and foaming at a vulcanization temperature of 120° to 140° C. for a vulcanization time of 5 to 10 minutes in a first step and at a vulcanization temperature of 125° to 160° C. for a vulcanization time of 5 to 20 minutes in a second step, the second step vulcanization temperature being higher than the first step by at least 5° C., so that the expansion factor will be 3 to 10 times. This crosslinked foamed body can be colored brilliantly, exhibit excellent weatherability, suppleness and shape retention as well as good outer appearance. This product is well usable, for example, as wet suits.

6 Claims, No Drawings

CROSSLINKED FOAMED BODY AND A PROCESS FOR ITS PRODUCTION

TECHNOLOGICAL FIELD

This invention relates to a crosslinked foamed body and a process for its production. More specifically, it relates to a crosslinked foamed body best suited for use as a wet suit which can be colored in a brilliant color and has excellent weatherability, pliability and shape retention, and to a process for its production.

BACKGROUND TECHNOLOGY

A crosslinked foamed body of chloroprene rubber has been conventionally used as a material for wet suits. Since the crosslinked foamed body of chloroprene rubber is soft and has excellent shape retention, it is suitable as a material for wet suits. However, in recent years, needs for fashionability of wet suits have increased, there has been a strong need for bright colors instead of a conventional black color. When products having bright colors are produced from the crosslinked foamed body of chloroprene rubber, there is a problem in that a crush occurs under sunlight because of the lack of weatherability.

On the other hand, a crosslinked foamed body of chlorosulfonated polyethylene is known as a crosslinked foamed body having excellent weatherability. But since this crosslinked foamed body is like a resin and lacks suppleness, it has inferior shape retention and cannot be used in uses which require suppleness and shape retention.

Japanese Laid-Open Patent Publication No. 266151/1989 describes a foamed body prepared by vulcanizing and foaming an ethylene chloride and α-olefin copolymer rubber. This foamed body has a good skin and holds suppleness and strength even after the lapse of time and does not show a large swelling even when it makes contact with a machine oil. But these characteristics are not entirely sufficient in utilities of wet suits which require both fashionability and functionality. Sometimes, the foaming is not uniform, the foamed body contracts after vulcanization and foaming, poor appearances such as fine creases may form on the surface, and foaming does not take place sufficiently.

DISCLOSURE OF THE INVENTION

An object of this invention is to provide a crosslinked foamed body which can be colored brilliantly and has excellent weatherability, suppleness and shape retention and good outer appearance, and a method of its production.

The present invention provides such crosslinked foamed body and a method of its production as follows:

(1) A crosslinking and foaming composition comprising (A) a chlorinated ethylene/α-olefin copolymer rubber having a chlorine content of 20 to 40% by weight and a Mooney viscosity [$ML_{1+4}$(121° C.)] of 10 to 190, (B) a triazine thiol represented by the following formula (1)

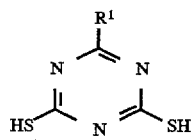

(1)

wherein $R^1$ is —$NR^2R^3$, —$OR^2$, or —$SR^2$, in which each of $R^2$ and $R^3$ represents a hydrogen atom, an unsubstituted or substituted alkyl group, or an unsubstituted or substituted aryl group, (C) an alkyl ammonium halide, and (D) a hydrazide-type blowing agent, said crosslinking and foaming body being vulcanized and foamed in two stages at an expansion ratio of 3 to 10 times at a first step vulcanization temperature of 120° to 140° C. for a vulcanization time of 5 to 10 minutes and at a second step vulcanization temperature of 125° to 160° C. which is higher than the first step vulcanization temperature by at least 5° C. for a vulcanization time of 5 to 20 minutes.

(2) A method of producing a crosslinked foamed body which comprises vulcanizing and blowing a crosslinking and foaming composition at a first step vulcanization temperature of 120° to 140° C. for a vulcanization time of 5 to 10 minutes and a second step vulcanization temperature of 125° to 160° C. which is higher than the first step vulcanization temperature by at least 5° C. for a vulcanization time of 5 to 20 minutes in two stages so that the expansion factor becomes 3 to 10 times, said crosslinking and foaming composition comprising (A) a chlorinated ethylene/α-olefin copolymer having a chlorine content of 20 to 40% by weight and a Mooney viscosity of [$ML_{1+4}$(121° C.)] of 10 to 190, (B) a triazine thiol of the above formula [1], (C) an alkyl ammonium halide and (D) a hydrazide-type blowing agent.

PREFERRED EMBODIMENTS OF THE INVENTION CHLORINATED ETHYLENE/α-OLEFIN COPOLYMER RUBBER

If the chlorine content is less than 20% by weight, the crosslinking does not take place sufficiently, and as a result, the shape retention of the copolymer becomes aggravated. On the other hand, if the chlorine content is above 40% by weight, the weatherability of the copolymer is worsened. Furthermore, if the Mooney viscosity of the copolymer rubber is less than 10%, strength characteristics are not developed. On the other hand, if the copolymer rubber has a Mooney viscosity of more than 190, the processability of the copolymer is markedly decreased.

Examples of α-olefin in the ethylene/α-olefin copolymer rubber before chlorination to form a 10 chlorinated ethylene/α-olefin copolymer rubber (A) include those having 3 to 10 carbon atoms, such as propylene, 1-butene, 1-pentene, 1-hexene, 4-methyl-pentene-1, 1-octene and 1-decene. Among these α-olefins, propylene, 1-butene, 4-methyl-pentene-1 and 1-hexene are preferred.

The proportions of ethylene and the α-olefin are ethylene/α-olefin=75/25–95/5, preferably 80/20–92/8, on a molar basis.

The ethylene/α-olefin copolymer may be additionally copolymerized with another polymerizable component in addition to the above α-olefin monomers. Examples of the other polymerizable components include chain-like non-conjugated dienes such as 1,4-hexadiene, 1,6-octadiene, 2-methyl-1,5-hexadiene, 6-methyl-1,5-heptadiene, and 7-methyl-1,6-octadiene; and non-conjugated dienes, for example, cyclic non-conjugated dienes such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene, and 6-chloromethyl-5-isopropenyl-2-norbornene. Among these, 5-vinyl-2-norbornene is preferred. The content of the other polymerizable component may preferably be 30 millimoles or less per 100 g of the total amount of the ethylene and α-olefin units.

The ethylene/α-olefin copolymer may be a rubbery polymer obtained by random-copolymerizing the above components.

The chlorinated ethylene/α-olefin copolymer rubber (A) is obtained by chlorinating the above ethylene/α-olefin copolymer.

The chlorination may be performed by a method of pulverizing the ethylene/α-olefin copolymer into fine particles, making the fine particles into an aqueous suspension and contacting the aqueous suspension of the fine particles with molecular chlorine at a temperature of about 70° to 90° C., a method of dissolving the ethylene/α-olefin copolymer in a solvent being stable to chlorine such as carbon tetrachloride, chloroform and tetrachloroethylene, and contacting the uniform solution with molecular chlorine, or a method of uniformly kneading a chlorination compound such as N-chloroacetamide, N-chlorosuccinimide and 1,3-dichloro-5,5-dimethylhydantoin with a Bumbury's mixer or a roll, and heating the kneaded mixture to a temperature which liberates chlorine. A method of blowing chlorine in the presence of a radical initiator in a halogen-type solvent such as carbon tetrachloride, or chloroform is especially preferred.

The degree of chlorination is adjusted by properly selecting the amount of molecular chlorine and another chlorinating agent, the reaction time, and the reaction temperature so that the above-mentioned chlorine content may be obtained.

After the chlorination reaction, the product is treated in the following manner. In the chlorination in the state of an aqueous suspension, the chlorinated ethylene/α-olefin copolymer rubber is washed with water to eliminate molecular chlorine and the by-product hydrogen chloride, and dried. In the case of chlorination in the form of a solution, the reaction solution is thrown into a poor solvent for the chlorinated ethylene/α-olefin copolymer rubber, for example, an excess of methanol, the precipitate is filtered, washed with this solvent, and dried. Or the reaction solution is formed into a thin film, and dried by removing the solvent with heat.

(Triazinethiol)

The triazinethiol (B) used in this invention is used as a vulcanizer. Examples of the triazinethiol of formula [1]include triazine-2,4,6-trithiol, 2-diethylaminotriazine-4, 6-dithiol, 2-dibutylaminotriazine-4, 6-dithiol, 2-hexyl-aminotriazine-4, 6-dithiol, 2-phenylaminotriazine-4, 6-dithiol and 2-butoxytriazine-4, 6-dithiol. Especially, the use of 2-dibutylaminotriazine-4, 6-dithiol is preferred.

Desirably, the triazinethiol compound (B) should be compounded in an amount of 1.5 to 5 parts by weight, preferably 2 to 4 parts by weight, per 100 parts by weight of the chlorinated ethylene/α-olefin copolymer rubber (A). If the compounding amount is less than 1.5 parts by weight, crosslinking does not take place sufficiently so that the shape retention of the copolymer will be aggravated. On the other hand, if the compounding amount exceeds 5 parts by weight, the crossliking density becomes too high, and the crosslinked foamed body is liable to tear up.

(Alkylammonium halide)

The alkylammonium halide (C) used in this invention is used as a vulcanization promotor, and is a primary to quaternary alkylammonium halide of general formula [2]

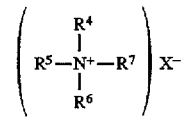

[2]

wherein each of $R^4$, $R^5$, $R^6$ and $R^7$ represents a hydrogen atom, an unsubstituted or substituted alkyl group, or an unsubstituted or substituted aryl group, and X represents a chlorine atom, a bromine atom or an iodine atom.

Examples of the unsubstituted or substituted alkyl groups represented by $R^4$ to $R^7$ include alkyl groups having 1 to 20 carbon atoms. Examples of the unsubstituted or substituted aryl groups include aryl groups having 6 to 20 carbon atoms.

As the alkylammonium halide (C), tertiary or quaternary alkylammonium halides are preferred. Quaternary alkylammonium halides are especially preferred.

Examples of specific alkylammonium halides (C) include distearyldimethyl ammonium chloride, stearyltrimethyl ammonium chloride, lauryltrimethyl ammonium chloride, and tetrabutyl ammonium bromide. The distearyldimethyl ammonium chloride is especially preferably used.

The alkylammonium halide (C) is desirably compounded in an amount of 1 to 10 parts by weight, preferably 2 to 5 parts by weight, per 100 parts by weight of the chlorinated ethylene/α-olefin copoymer rubber (A). If the compounding amount of the alkyl ammonium halide (C) is less than 1 part by weight, the crosslinking velocity is not sufficient, and as a result, a crosslinked foamed body having excellent suppleness cannot be obtained. On the other hand, when the compounding amount exceeds 10 parts by weight, the crosslinking speed becomes too fast so that the compounded product has lowered storage stability and becomes not practicable.

(Hydrazide-type blowing agent)

Known hydrazide-type blowing agents used conventionally in the production of blown products can be used as the hydrazide-type blowing agents in the present invention. Such hydrazide-type blowing agents (D) may include benzene sulfonyl hydrazide, p,p'-oxybis(benzenesulfonyl hydrazide) and toluene sulfonyl hydrazide.

The hydrazide-type blowing agent (D) is desirably compounded in an amount of 5 to 25 parts by weight, preferably 7 to 20 parts by weight, per 100 parts by weight of the chlorinated ethylene/α-olefin copolymer rubber (A). If the compound amount of the hydrazide-type blowing agent (D) is less than 5 parts by weight, the expansion factor becomes smaller, and as a result, it is impossible to produce a soft crosslinked foamed body. On the other hand, when the compounding amount exceeds 25 parts by weight, the expansion factor does not vary and therefore, it has no practical significance.

The above essential components (A) to (D) are exemplified in the above Japanese Laid-Open Patent Publication No. 256151/1950. By combining and selecting (A) and (D) among many components described in the above components and vulcanizing and foaming the components in two stages, the object of this invention may be achieved.

(Other compounding agents)

In addition to the above essential components (A) to (D), known compounding agents according to the utilities ahd the intended vulcanized products and performances based on them, such as reinforcing materials for rubbers, pigments, fillers, softening agents, metal-activating agents, scorch preventing agents, hydrochloric acid absorbers, age resisting agents and processing agents may be added.

When the pigments are compounded, bright-colored crosslinked foamed bodies having excellent fashionability are colored brilliantly.

Known pigments may be used. There are used inorganic pigments such as titanium white, titanium black, red iron oxide, cadmium mercury red, cadmium yellow, titanium yellow and ultramarine; and organic pigments such as Naphthol Green B, Phthalocyanine Green, Phthalocyanine Blue, Permanent Red 4R, Fast Yellow G, Fast Yellow 10G, Disazo Yellow GR, Disazo Orange, Pyrazolone Orange, Brilliant Scarlet G, Bordeaux 5B, Pyrazolone Red and Permant Carmine FB. The compounding amounts of these pigments differ depending upon the products. But they should be desirably compounded in an amount of 20 parts by weight at a maximum, preferably 10 parts by weight at a maximum, per 100 parts by weight of the chlorinated ethylene/α-olefin copoymer rubber (A).

Examples of the reinforcing agents for rubbers include various carbon blacks such as SRF, GPF, FEF, MAF, ISAF, SAF, FT and MT and fine powdery silicic acid.

Examples of the fillers proper include soft calcium carbonate, heavy calcium carbonate, talc and clay.

Examples of the softening agents include petroleum-type substances such as process oil, lubricant oils, paraffin, liquid paraffin, petroleum asphalt and vaseline; coal tars such as coal tar, and coal tar pitch; fatty oils such as castor oil, rapeseed oil, soybean oil and coconut oil; waxes such as tall oil, bees wax, carnauba wax and lanolin; fatty acids or metal salts thereof, such as ricinoleic acid, palmitic acid, stearic acid, barium stearate and calcium stearate; polymeric substances such as terpene resins, petroleum resins, coumarone indene resin and atactic polypropylene; ester-type plasticizers such as dioctyl phthalate, dioctyl adipate and dioctyl sebacate and plasticizers such as ester-type oils, white vaseline and carbonate-type plasticizers; and naphthenic acid, or its metal soaps, pine oil, rosin, or its derivatives, microcrystalline wax, substitute (factice), liquid polybutadiene, modified liquid polybutadiene and liquid thiokol.

The compounding amount of the softening agent may be properly selected depending upon the desired product, but may be usually 100 parts by weight or below, preferably 70 parts by weight or below, per 100 parts by weight of the chlorinated ethylene/α-olefin copolymer rubber (A).

Examples of the metal activating agent include magnesium oxide, a zinc salt of a higher fatty acid, red lead, litharge, calcium oxide and hydrotalcite. Desirably, the metal activating agent may be used in an amount of 3 to 15 parts by weight, preferably 5 to 10 parts by weight, per 100 parts by weight of the chlorinated ethylene/α-olefin copolymer rubber (A).

The scorch preventing agents may be known scorch preventing agents, and examples include maleic anhydride, thioimide-type compounds, sulfenamide-type compounds and sulfonamide-type compounds. The scorch preventing agent may be used usually in an amount of 0.2 to 5 parts by weight, preferably in an amount of 0.3 to 3 parts by weight, per 100 parts by weight of the chlorinated ethylene/α-olefin copolymer rubber (A).

As the hydrochloric acid absorbing agent, oxides or organic acid salts of metals of Group 11A of the periodic table may be used. Examples include magnesium stearate, magnesia, calcium stearate, manasseite, hydrotalcite, epoxidized soybean oil and epoxy-type hydrochloric acid absorbing agents. These hydrochloric acid absorbing agents may be used in an amount of usually 10 parts by weight or less per 100 parts by weight of the chlorinated ethylene/α-olefin copolymer rubber (A).

The crosslinked foamed bodies of the present invention show excellent heat resistance and durability even without the use of the antioxidants. But the use of the antioxidants gives products having the crosslinked foamed bodies of the present invention which have prolonged lives of materials as is the same as usual rubbers. Examples of the antioxidants include aromatic secondary amines such as phenylbutylamine and N,N'-di-2-naphthyl-p-phenylen ediamine; phenol-type stabilizers such as dibutyl-hydroxytoluene and tetrakis[methylene(3,5-di-t-butyl-4-hydroxy) hydrocinnamate]methan; thioether-type stabilizers such as bis[2-methyl-4-(3-n-alkylthiopropionyloxy)-5-t-butylphenyl]sulfide; and dithiocarbamate-type stabilizers such as nickel dibutylthiocarbamate. The amount of such an antioxidant may be desirably in an amount of 0.1 to 5 parts by weight, preferably 0.5 to 3 parts by weight, per 100 parts by weight of the chlorinated ethylene/α-olefin copolymer rubber (A).

As the above processing aids, those which are used in the processing of usual rubbers, may be used in this invention. Examples include ricinoleic acid, stearic acid, palmitic acid, lauric acid, barium stearate, calcium stearate, zinc stearate, esters of the above acids, higher fatty acids, or their salts and esters. These processing aids are desirably used ordinarily in an amount of up to about 10 parts by weight, preferably about 1 to 5 parts by weight, per 100 parts by weight of the chlorinated ethylene/α-olefin copoymer rubber (A).

(A Method of Producing a Crosslinked Foamed Body)

The crosslinked foamed body of this invention may be produced by the following method. First, the essential components (A) to (D) and as required, compounding agents are mixed to prepare a crosslinking and foaming composition which is an unvulcanized rubber compounded product. In this case, the chlorinated ethylene/α-olefin copolymer rubber (A) as an essential component and compounding agents to be compounded as required were kneaded at a temperature of about 80° to 170° C. for about 3 to 10 minutes by using a mixer such as a Bumbury's mixer. Then, essential components (B) to (D) were additionally mixed by using a roll such as an open roll and these components were additionally kneaded for about 3 minutes to 30 minutes at a roll temperature of about 40° to 80° C. and sheeted to prepare a ribbon-like or sheet-like unvulcanized crosslinking and foaming composition.

The unvulcanized crosslinking and foaming composition so prepared was vulcanized (stepping vulcanization) in two steps. Vulcanization within a mold may be press-vulcanized using a closed mold, or may be can-vulcanized using a mold, or may be continuously press-vulcanized.

Of these, press-vulcanization using a closed mold is preferred in this invention.

In this invention, the stepping vulcanization can be carried out by performing the first step vulcanization at a vulcanization temperature of 120° to 140° C., preferably a vulcanization temperature of 125° to 135° C., for a vulcanization time of 5 to 10 minutes, preferably 7 to 10 minutes, and performing the second step vulcanization at a vulcanization temperature of 125° to 160° C., preferably a vulcanization temperature of 130° to 140° C., at a vulcanization temperature of higher than the first step vulcanization temperature by at least 5° C., for a vulcanization time of 5 to 20 minutes so that the expansion factor in the first and second steps in total becomes 3 to 10 times, preferably 5 to 10 times. By carrying out such two step vulcanization, the expansion is carried out in two steps to form a crosslinked foamed body.

Since the foamed body produced by this invention can be foamed uniformly or does not shrink even after it is cooled to room temperature, creases do not form at all, and the foamed body has a good appearance. Furthermore, it is colored brilliantly by compounding a pigment, and the foamed body has excellent weatherability, suppleness and shape retention.

EXAMPLES

Examples of the invention will be illustrated.

Example 1

The compounding agents shown in Table 1 (4.3 liters) were kneaded for 5 minutes by a Bumbury's mixer (produced by Kobe Steel Co., Ltd.) and dumped out. The kneaded product dumped out was wrapped over an 8-inch open roll (made by Nippon Roll Co., Ltd.). The roll surface temperature at this time was 50° C. at a front roll, and 50° C. at a rear roll. On the open roll the compounding agents shown in Table 2 were added, and kneaded for 5 minutes to form a sheet having a thickness of 2 mm and a weight of 36 g to form an unvulcanized rubber.

TABLE 1

| Compounding agents | Parts by weight |
|---|---|
| Chlorinated ethylene/1-butene copolymer rubber 1) | 100.0 |
| Stearic acid | 3.0 |
| Hydropalcite 2) | 7.0 |
| Calcium carbonate | 40.0 |
| Ester-type oil 3) | 35.0 |
| White vaseline 4) | 5.0 |

1) Mole ratio of ethylene/1-butene = 90/10 [$ML_{1+4}$(121° C.) = 40] with a chlorine content of 27% by weight.
2) DHT-6 (produced by Kyowa Chemicals Co., Ltd., trademark)
3) Dioctyl phthalate made by Wako Junyaku Co., Ltd.
4) Produced by Taisei Kosan Co., Ltd.

TABLE 2

| Compounding agents | Parts by weight |
|---|---|
| 2-Dibutylaminotriazine-4,6-dithiol 1) | 3.0 |
| Distearyldimethylammonium chloride 2) | 2.0 |
| Hydrazine-type blowing agent 3) | 20.0 |

1) ZINSET-MP, made by Sankyo Chemical Co., Ltd., trademark
2) Arquads 2HTF: produced by Lion Akzo Co., Ltd., trademark
3) N4000: produced by Eiwa Chemical Co., Ltd., trademark Then, the sheeted unvulcanized rubber was put in to a mold having a size of 100 mm×100 mm×3 mm, and vulcanized and blown under conditions shown in the first step in Table 6 by using a 100-ton press molding machine (KMF 100-1E: Kotaki Co., Ltd., trademark). Furthermore, the sponge taken out was put into a mold having a size of 200 mm×200 mm×6 mm and subjected to vulcanization and blowing under the conditions of the second step shown in Table 6 to prepare a crosslinked foamed body. The results of the testings of the crosslinked and foamed body are shown in Table 6.

Example 2

In Example 1, the compounding agents shown in Table 3 were used instead of the compounding agents shown in Table 1. Otherwise, a crosslinked foamed body was prepared in the same way as shown in Example 1. The test results are shown in Table 6.

TABLE 3

| Compounding agents | Parts by weight |
|---|---|
| Chlorinated ethylene/1-butene copolymer rubber 1) | 100.0 |
| Stearic acid | 3.0 |
| Hydrotalcite 2) | 7.0 |
| Talc 3) | 40.0 |
| Ester-type oil 4) | 35.0 |
| White vaseline 5) | 5.0 |

1) Mole ratio of ethylene/1-butene = 90/10 [$ML_{1+4}$ (121° C.)] = 40 Chlorine content = 27% by weight
2) DHT-6: Kyowa Chemicals Co., Ltd., trademark
3) Mistron Paper Talc: Japan Mistron Co., Ltd., trademark
4) Dioctyl phthalate: Wako Junyaku Co., Ltd.
5) Produced by Taisei Kosan Co., Ltd.

Comparative Example 1

In Example 1, the conditions of crosslinking and foaming were changed to those shown in Table 6. Otherwise, in the same way as in Example 1, a crosslinked foamed body was prepared. The test results are shown in Table 6.

Comparative Example 2

In Example 1, the conditions of crosslinking and foaming were changed to those shown in Table 6. Otherwise, in the same way as in Example 1, a crosslinked foamed body was prepared. The test results are shown in Table 6.

Comparative Example 3

In Example 1, the conditions of crosslinking and foaming were changed to those shown in Table 6. Otherwise, in the same way as in Example 1, a crosslinked foamed body was prepared. The test results are shown in Table 6.

Comparative Example 4

In Example 1, the compounding agents shown in Table 2 were changed to those shown in Table 4. Otherwise, in the same way as in Example 1 a crosslinked foamed body was prepared. The test results are shown in Table 6.

TABLE 4

| Compounding agents | Parts by weight |
|---|---|
| 2-Dibutylaminotriazine-4,6-dithiol | 3.0 |
| Benzoic acid.piperidine salt | 3.0 |
| Hydrazine-type blowing agent 3) | 20.0 |

3) N4000: Eiwa Chemicals Co., Ltd., trademark

Comparative Example 5

In Example 1, the compounding agents shown in Table 2 were changed to the compounding agents shown in Table 5. Otherwise, a crosslinked foamed body was obtained in the same way as in Example 1. The test results are shown in Table 6.

TABLE 5

| Compounding agents | Parts by weight |
|---|---|
| Dicumyl peroxide | 7.0 |
| Triallyl isocyanurate | 3.5 |
| Hydrazine-type blowing agent 3) | 20.0 |

3) N4000: Eiwa Chemicals Co., Ltd., trademark

TABLE 6

| | Vulcanization and foaming conditions (temp. °C. × minute) | | Expansion factor | Results |
|---|---|---|---|---|
| | first step | second step | (times) | *1) |
| Example | | | | |
| 1 | 130 × 7 | 140 × 5 | 6 | good |
| 2 | 130 × 10 | 135 × 20 | 8 | good |
| Comp. Ex. | | | | |
| 1 | 120 × 15 | 140 × 5 | 5 | poor 1 |
| 2 | 115 × 3 | 140 × 5 | 2 | poor 2 |
| 3 | 150 × 5 | 160 × 5 | 4 | poor 1 |
| 4 | 130 × 7 | 140 × 5 | 2 | poor 4 |
| 5 | 130 × 7 | 140 × 5 | 2 | poor 3 |

*1):
Poor 1: The blowing was non-uniform.
Poor 2: There was an unvulcanized portion.
Poor 3: The blowing was insufficient.
Poor 4: The foamed body was shrunken when it was taken out from the mold.

The results from Table 6 show that in Comparative Examples 1 to 3 in which the vulcanization and foaming conditions were outside the ranges of the present invention, vulcanization and blowing was not carried out well. In Comparative Example 4 in which benzoic acid.piperidine salt was use as a vulcanization promotor, gas escaping took place immediately after vulcanization, and the crosslinked foamed body was shrunken. In Comparative Example 5 in which dicumyl peroxide was used as a vulcanizer, the blowing of the crosslinked foamed body was insufficient. This was because dicumyl oxide and the radical formed at a time of decomposing the blowing agent react to make a vulcanization hazard, and as a result, the blowing became insufficient.

POSSIBILITY OF UTILIZATION IN INDUSTRY

The crosslinked foamed body of the present invention is obtained by combining a specified chlorinated ethylene/α-olefin copolymer rubber with a specified vulcanizing agent, a specified vulcanization promotor and a specified blowing agent, and vulcanizing and foaming the mixture in two steps under specified conditions, whereby the crosslinked foamed body obtained can be colored brilliantly and has excellent weatherability, suppleness and shape retention as well as a good outer appearance.

Accordingly, the crosslinked and foamed body of this invention can be suitably used in uses requiring fashionability, weatherability, suppleness and shape retention such as wet suits, surfer's suits and ski wears.

What is claimed is:

1. A process for producing a crosslinked foamed body, which comprises vulcanizing and foaming in two stages a crosslinking and foaming composition at a vulcanization temperature of 120° to 140° C. for a vulcanization time of 5 to 10 minutes in a first step, and at a vulcanization temperature of 125° to 160° C. in a second step, the second step vulcanization temperature being higher than the first step vulcanization temperature by at least 5° C., for a second step vulcanization time of 5 to 20 minutes so that the expansion factor becomes 3 to 10 times, the crosslinking and foaming composition comprising (A) a chlorinated ethylene/α-olefin copolymer rubber having a chlorine content of 20 to 40% by weight and a Mooney viscosity of [ML$_{1+4}$(121° C.)] of 10 to 190, (B) a triazinethiol represented by the general formula (1)

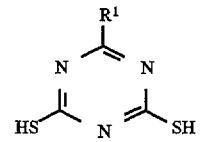

wherein R$^1$ represents —NR$^2$R$^3$, —OR$^2$ or —SR$^2$ in which each of R$^2$ and R$^3$ represents a hydrogen atom, an unsubstituted or substituted alkyl group or an unsubstituted or substituted aryl group, (C) an alkyl ammonium halide and (D) a hydrazide blowing agent.

2. A method of producing a crosslinked foamed body of claim 1 wherein the two step vulcanization and foaming is carried out by press-vulcanization with the use of a closed mold.

3. The method of claim 1 wherein in the first step the vulcanization temperature is from 125° to 135° C. for a vulcanization time of from 7 to 10 minutes and in the second step the vulcanization temperature is from 130° to 140° C., and wherein the expansion factor becomes 5 to 10.

4. The method of claim 1 wherein the crosslinking and foaming composition further comprises pigment for imparting a bright color to the resulting cross-linked foamed body.

5. The method of claim 1 wherein the crosslinking and foaming composition comprises (A) a chlorinated ethylene/1-butene random copolymer having an ethylene/1-butene molar ratio of from 75/25 to 95/5;

(B) 2-butylaminotriazine-4,6-dithiol;

(C) distearyldimethylammonium chloride; and (D) benzene sulfonyl hydrazide, p,p'-oxybis (benzenesulfonyl hydrazide) or toluene sulfonyl hydrazide.

6. The method of claim 5 wherein the crosslinking and foaming composition further comprises pigment for imparting a bright color to the resulting cross-linked foamed body.

* * * * *